United States Patent
Liu et al.

(10) Patent No.: US 11,132,145 B2
(45) Date of Patent: Sep. 28, 2021

(54) TECHNIQUES FOR REDUCING WRITE AMPLIFICATION ON SOLID STATE STORAGE DEVICES (SSDS)

(71) Applicant: Apple Inc., Cupertino, CA (US)

(72) Inventors: Yuhua Liu, Belmont, CA (US); Andrew W. Vogan, Cupertino, CA (US); Matthew J. Byom, San Jose, CA (US); Alexander Paley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 16/124,154

(22) Filed: Sep. 6, 2018

(65) Prior Publication Data

US 2019/0286369 A1    Sep. 19, 2019

Related U.S. Application Data

(60) Provisional application No. 62/643,123, filed on Mar. 14, 2018.

(51) Int. Cl.
*G06F 12/00* (2006.01)
*G06F 13/00* (2006.01)
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679

USPC ........................................................ 711/103
See application file for complete search history.

(56) References Cited

U.S. PATENT DOCUMENTS

| | | | | |
|---|---|---|---|---|
| 4,805,098 A | * | 2/1989 | Mills, Jr. ............. | G06F 13/1631 711/118 |
| 5,592,432 A | * | 1/1997 | Vishlitzky ........... | G06F 11/3419 365/230.03 |
| 5,706,467 A | * | 1/1998 | Vishlitzky ............. | G06F 12/123 711/118 |
| 5,751,993 A | * | 5/1998 | Ofek ..................... | G06F 12/121 710/54 |
| 5,911,051 A | * | 6/1999 | Carson .................. | G06F 13/161 710/107 |
| 5,990,913 A | * | 11/1999 | Harriman .................. | G06F 3/14 345/501 |

(Continued)

*Primary Examiner* — Sheng Jen Tsai
(74) *Attorney, Agent, or Firm* — Dickinson Wright RLLP

(57) ABSTRACT

Disclosed herein are techniques for reducing write amplification when processing write commands directed to a non-volatile memory. According to some embodiments, the method can include the steps of (1) receiving a first plurality of write commands and a second plurality of write commands, where the first plurality of write commands and the second plurality of write commands are separated by a fence command (2) caching the first plurality of write commands, the second plurality of write commands, and the fence command, and (3) in accordance with the fence command, and in response to identifying that at least one condition is satisfied: (i) issuing the first plurality of write commands to the non-volatile memory, (ii) issuing the second plurality of write commands to the non-volatile memory, and (iii) updating log information to reflect that the first plurality of write commands precede the second plurality of write commands.

20 Claims, 10 Drawing Sheets

(56) References Cited

U.S. PATENT DOCUMENTS

| | | | | |
|---|---|---|---|---|
| 6,047,334 A * | 4/2000 | Langendorf | G06F 9/3836 | 710/24 |
| 6,158,019 A * | 12/2000 | Squibb | G06F 11/1469 | 714/13 |
| 6,173,378 B1 * | 1/2001 | Rozario | G06F 13/18 | 365/230.05 |
| 6,205,450 B1 * | 3/2001 | Kanome | G06F 11/1435 | 707/649 |
| 6,393,512 B1 * | 5/2002 | Chen | G06F 13/1647 | 711/5 |
| 6,393,534 B1 * | 5/2002 | Chen | G06F 13/1631 | 711/158 |
| 6,629,198 B2 * | 9/2003 | Howard | G06F 11/1004 | 711/112 |
| 6,667,926 B1 * | 12/2003 | Chen | G06F 13/161 | 365/221 |
| 7,398,335 B2 * | 7/2008 | Sonksen | G06F 13/28 | 709/232 |
| 7,831,550 B1 * | 11/2010 | Pande | G06F 16/27 | 707/610 |
| 10,228,865 B1 | 3/2019 | Colgrove | G06F 3/0611 | |
| 2002/0083254 A1 * | 6/2002 | Hummel | G06F 13/24 | 710/261 |
| 2002/0103948 A1 * | 8/2002 | Owen | G06F 13/4243 | 710/33 |
| 2002/0108017 A1 * | 8/2002 | Kenchammana-Hoskote | G06F 12/0804 | 711/113 |
| 2002/0169947 A1 * | 11/2002 | Bilardi | G06F 9/3834 | 712/219 |
| 2003/0188072 A1 * | 10/2003 | Creta | G06F 13/4031 | 710/306 |
| 2004/0160446 A1 * | 8/2004 | Gosalia | G06F 9/5038 | 345/503 |
| 2005/0038964 A1 * | 2/2005 | Hooper | G06F 12/0842 | 711/143 |
| 2005/0172074 A1 * | 8/2005 | Sinclair | G06F 3/0634 | 711/114 |
| 2007/0038799 A1 * | 2/2007 | Hummel | G06F 12/1081 | 711/3 |
| 2007/0038839 A1 * | 2/2007 | Hummel | G06F 12/1081 | 711/207 |
| 2007/0038840 A1 * | 2/2007 | Hummel | G06F 12/1081 | 711/207 |
| 2007/0113233 A1 * | 5/2007 | Collard | G06F 9/52 | 718/101 |
| 2008/0209130 A1 * | 8/2008 | Kegel | G06F 12/1081 | 711/135 |
| 2009/0177822 A1 * | 7/2009 | Adar | G06F 13/362 | 710/110 |
| 2009/0235115 A1 * | 9/2009 | Butlin | G06F 11/1662 | 714/6.13 |
| 2011/0078277 A1 * | 3/2011 | Baptist | G06F 3/0617 | 709/217 |
| 2011/0078692 A1 * | 3/2011 | Nickolls | G06F 9/30087 | 718/103 |
| 2011/0154102 A1 * | 6/2011 | Akutsu | G06F 11/2074 | 714/6.1 |
| 2011/0252181 A1 * | 10/2011 | Ouye | G06F 3/0613 | 711/101 |
| 2011/0283045 A1 * | 11/2011 | Krishnan | G06F 9/544 | 711/102 |
| 2012/0198174 A1 * | 8/2012 | Nellans | G06F 3/0655 | 711/133 |
| 2012/0198214 A1 * | 8/2012 | Gadre | G06F 9/3004 | 712/225 |
| 2012/0254541 A1 * | 10/2012 | Beckmann | G06F 12/0802 | 711/122 |
| 2012/0278530 A1 * | 11/2012 | Ebsen | G06F 13/1673 | 711/103 |
| 2012/0278792 A1 * | 11/2012 | Kuperstein | G06F 11/3604 | 717/131 |
| 2012/0317353 A1 * | 12/2012 | Webman | G06F 3/0613 | 711/108 |
| 2013/0185475 A1 * | 7/2013 | Talagala | G06F 12/0866 | 711/102 |
| 2013/0254488 A1 * | 9/2013 | Kaxiras | G06F 9/3004 | 711/130 |
| 2014/0298058 A1 * | 10/2014 | Klingauf | G06F 1/3296 | 713/322 |
| 2014/0304525 A1 * | 10/2014 | Novak | G06F 3/0659 | 713/193 |
| 2015/0149673 A1 * | 5/2015 | Balkan | G06F 13/362 | 710/110 |
| 2016/0012856 A1 * | 1/2016 | Cave, Jr. | G11B 27/005 | 386/241 |
| 2016/0092123 A1 | 3/2016 | Kumar et al. | | |
| 2017/0010815 A1 * | 1/2017 | Sprouse | G06F 3/0631 | |
| 2017/0123995 A1 * | 5/2017 | Freyensee | G06F 11/2094 | |
| 2017/0351433 A1 | 12/2017 | Walker et al. | | |
| 2018/0011636 A1 * | 1/2018 | Suzuki | G06F 13/16 | |
| 2018/0088827 A1 | 3/2018 | Shu et al. | | |
| 2018/0136849 A1 | 5/2018 | Shirota et al. | | |
| 2018/0189062 A1 * | 7/2018 | Baghsorkhi | G06F 15/76 | |
| 2018/0225208 A1 * | 8/2018 | Fukuyama | G06F 9/30043 | |
| 2018/0239725 A1 * | 8/2018 | Kumar | G06F 13/4068 | |
| 2018/0246808 A1 * | 8/2018 | Kawaguchi | G06F 12/0238 | |
| 2018/0286357 A1 * | 10/2018 | Koker | G02B 27/017 | |
| 2019/0179750 A1 * | 6/2019 | Moyer | G06F 11/2069 | |
| 2019/0205244 A1 * | 7/2019 | Smith | G06F 12/0866 | |
| 2020/0304238 A1 * | 9/2020 | Xiao | G06F 3/0673 | |

* cited by examiner

TECHNIQUES FOR REDUCING WRITE AMPLIFICATION ON SOLID STATE STORAGE DEVICES (SSDS)

CROSS-REFERENCE TO RELATED APPLICATIONS

The present application claims the benefit of U.S. Provisional Application No. 62/643,123, entitled "TECHNIQUES FOR REDUCING WRITE AMPLIFICATION ON SOLID STATE STORAGE DEVICES (SSDs)," filed Mar. 14, 2018, the content of which is incorporated herein by reference in its entirety for all purposes.

FIELD

The described embodiments set forth techniques for managing data coherency within a filesystem when writing data into a non-volatile memory (e.g., a solid-state drive (SSD)). In particular, the techniques enable the filesystem to maintain data coherency while substantially reducing the overall write amplification that typically occurs when persisting data to the SSD.

BACKGROUND

Solid state drives (SSDs) are a type of storage device that share a similar physical footprint with (and provide similar functionality as) traditional magnetic-based hard disk drives (HDDs). Notably, standard SSDs—which utilize "flash" memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory sectors of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can preserve I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Despite the foregoing benefits provided by SSDs, some drawbacks remain that have yet to be addressed, including a phenomenon commonly known as "write amplification" that negatively impacts the overall performance of SSDs. As is well-known, write amplification can occur due to the nature in which existing SSDs operate. For example, a given SSD can require that all pages within a given block must first be completely erased before new data is written into one or more of the pages. Consequently, when the existing data within a pending-erase page needs to be retained within the SSD, additional write commands are required to migrate the existing data to a new storage area within the SSD. In another example, the SSD can require a minimum amount of data to be included in each write operation that is executed. As a result, small write commands often increase in size and branch into several write commands that occur within the SSD. Unfortunately, this phenomenon is problematic given that the overall lifespans of modern SSDs are limited to a relatively small number of write cycles.

Importantly, the above-described write amplification issues apply directly to a "flush" commands (also referred to as barrier commands) that are frequently issued in association with journal-based file systems. In particular, a flush command directed toward a given SSD can require that all outstanding commands issued prior to the flush command are immediately forced onto the SSD before processing any additional commands issued after the flush command. Notably, to maintain overall coherency within the journal-based filesystem, the flush command can result in, for example, performing updates to the actual underlying data of the journal-based filesystem (e.g., new data writes), performing updates to a primary journal of the journal-based filesystem, and performing updates to an indirection table that describes a layout of the journal-based filesystem. These flush commands involve somewhat small input/output (I/O) operations that, at first glance, impose little overhead on the SSD. For example, a flush command can result in (i) a 1 kB write of data to the SSD, and (2) a 0.1 kB write of data to the primary journal to reflect the write of the data. However, as noted above, small writes can still cause a considerable amount of write amplification, thereby contributing to a rapid degradation of the integrity of the SSD. Moreover, these write amplification issues are exacerbated as the minimum write requirements of SSDs continue to increase as SSDs evolve, e.g., 48 kB minimum write requirements for triple level cell (TLC) SSDs.

Accordingly, what is needed is an approach for efficiently maintaining data coherency while substantially reducing the overall write amplification that typically occurs when issuing flush commands to SSDs.

SUMMARY

The described embodiments set forth techniques for managing data coherency within a filesystem when writing data into a non-volatile memory (e.g., a solid-state drive (SSD)). In particular, the techniques involve a "fence" command that provides coherency benefits similar to traditional flush/barrier commands, without requiring the immediate persistence of relatively small write operations to the non-volatile memory that otherwise result in write amplification.

One embodiment sets forth a technique for reducing write amplification when processing write commands directed to a non-volatile memory. According to some embodiments, the method can include the steps of (1) receiving a first plurality of write commands and a second plurality of write commands, where the first plurality of write commands and the second plurality of write commands are separated by a fence command, (2) caching the first plurality of write commands, the second plurality of write commands, and the fence command, and (3) in accordance with the fence command, and in response to identifying that at least one condition is satisfied: (i) issuing the first plurality of write commands to the non-volatile memory, (ii) issuing the second plurality of write commands to the non-volatile memory, and (iii) updating log information to reflect that the first plurality of write commands precede the second plurality of write commands.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well-known process steps have not been described in detail in order to avoid unnecessarily obscuring the presently described embodiments. Other applications are possible, such that the following examples should not be taken as limiting.

Figure 1A:
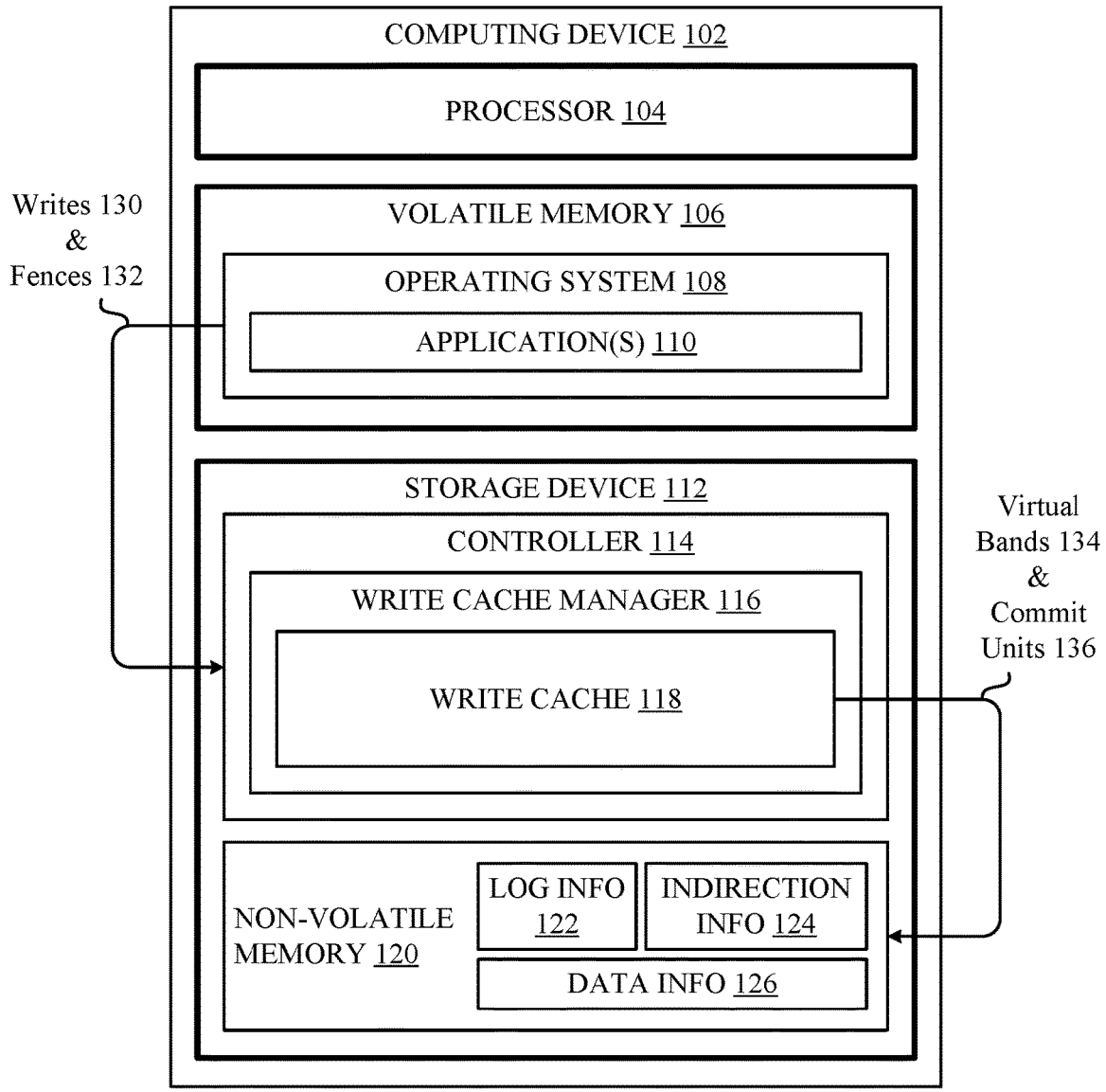
FIGS. 1A-1C illustrate conceptual diagrams of different components of a computing device that is configured to implement the various techniques described herein, according to some embodiments.

FIG. 1A illustrates a conceptual diagram 100 of a computing device 102—e.g., a smart phone, a tablet, a laptop, a desktop, a server, etc.—that can be configured to implement the various techniques described herein. As shown in FIG. 1A, the computing device 102 can include a processor 104 that, in conjunction with a volatile memory 106 (e.g., a dynamic random-access memory (DRAM)) and a storage device 112 (e.g., a solid-state drive (SSD)), enables different software entities to execute on the computing device 102.

For example, the processor 104 can be configured to load, from the storage device 112 into the volatile memory 106, various components for an operating system (OS) 108. In turn, the operating system 108 can enable the computing device 102 to provide a variety of useful functions, e.g., loading/executing various applications 110 (e.g., user applications). It should be understood that the various hardware components of the computing device 102 illustrated in FIG. 1A are presented at a high level in the interest of simplification, and that a more detailed breakdown is provided below in conjunction with FIG. 5.

As shown in FIG. 1A, the operating system 108/applications 110 can issue write commands 130 to the storage device 112, e.g., new data writes, existing data overwrites, existing data migrations, and so on. Additionally, the operating system 108/applications 110 can issue "fence" commands 132 that require the storage device 112 to honor the order in which the write commands 130 are issued relative to the fence commands 132. However, as described in greater detail herein, the fence commands 132 do not require the outstanding write commands 130 to be immediately issued to the storage device 112 (as required by conventional "flush" and "barrier" commands). Instead, the fence commands 132 can enable the storage device 112 to effectively cache different write commands 130 together that precede/follow the fence commands 132. In turn, the storage device 112 can group together the cached write commands 130 and issue them to a non-volatile memory 120 (of the storage device 112) in accordance with the fence commands 132. A more detailed explanation of how fence commands 132 can be used to enforce an overall ordering of write commands 130 is provided below in conjunction with FIGS. 2A-2C, 3A-3B, and 4.

According to some embodiments, and as shown in FIG. 1A, the storage device 112 can include a controller 114 that is configured to orchestrate the overall operation of the storage device 112. In particular, the controller 114 can implement a write cache manager 116 that receives various write commands 130 and fence commands 132 and stores them into a write cache 118. According to some embodiments, and as described in greater detail herein, the write cache manager 116 can transmit, to the non-volatile memory 120, the write commands 130 stored in the write cache 118. In particular, the write cache manager 116 can utilize virtual bands 134 and commit units 136 to transmit the write commands 130 in accordance with orderings dictated by the fence commands 132. A more detailed breakdown of the virtual bands 134 and commit units 136 is provided below in conjunction with FIG. 1C. It is noted that the controller 114 can include additional entities that enable the implementation of the various techniques described herein without departing from the scope of this disclosure. Is further noted that the entities described herein can be combined or split into additional entities without departing from the scope of this disclosure. It is additionally noted that the various entities described herein can be implemented using software-based or hardware-based approaches without departing from the scope of this disclosure.

According to some embodiments, and as additionally shown in FIG. 1A, the non-volatile memory 120 can include log information 122, indirection information 124, and data information 126. According to some embodiments, transactional information associated with the indirection information 124/data information 126—e.g., details associated with I/O requests processed by the controller 114—can be written into the log information 122, such that replay operations can be performed to restore coherency when recovering from power failures. For example, the transactional information can be utilized to restore the content of the indirection information 124 when an inadvertent shutdown of the computing device 102 renders at least a portion of the content out-of-date. According to some embodiments, the content stored in the indirection information 124 can include context information that serves as a mapping table for data that is stored within the data information 126. According to some embodiments, the context information can be transmitted between the volatile memory 106 and the non-volatile memory 120 using direct memory access (DMA) such that the processor 104 plays little or no role in the data transmissions between the volatile memory 106 and the non-volatile memory 120. It is noted, however, that any technique can be utilized to transmit data between the volatile memory 106 and the non-volatile memory 120 without departing from the scope of this disclosure.

According to some embodiments, the context information can be organized into a hierarchy that includes first and second depth levels. In particular, the first depth level can correspond to a collection of "first-tier" entries, while the second depth level can correspond to a collection of "second-tier" entries. According to some embodiments, the first and second-tier entries can store data in accordance with different encoding formats that coincide with the manner in which the non-volatile memory 120 is partitioned into different sectors. For example, when each sector represents a 4 kB sector of memory, each first-tier entry can correspond to a contiguous collection of two hundred fifty-six (256) sectors. In this regard, the value of a given first-tier entry can indicate whether the first-tier entry (1) directly refers to a physical location (e.g., an address of a starting sector) within the non-volatile memory 120, or (2) directly refers (e.g., via a pointer) to one or more second-tier entries. According to some embodiments, when condition (1) is met, it is implied that all (e.g., the two-hundred fifty-six (256)) sectors associated with the first-tier entry are contiguously written, which can provide a compression ratio of 1/256. More specifically, this compression ratio can be achieved because the first-tier entry stores a pointer to a first sector of the two hundred fifty-six (256) sectors associated with the first-tier entry, where no second-tier entries are required. Alternatively, when condition (2) is met, information included in the first-tier entry indicates (i) one or more second-tier entries that are associated with the first-tier entry, as well as (ii) how the information in the one or more second-tier entries should be interpreted. Using this approach, each second-tier entry can refer to one or more sectors, thereby enabling data to be disparately stored across the sectors of the non-volatile memory 120.

It is noted that a more detailed breakdown of various indirection techniques that can be utilized by the embodiments set forth herein can be found in U.S. patent application Ser. No. 14/710,495, filed May 12, 2015, entitled "METHODS AND SYSTEM FOR MAINTAINING AN INDIRECTION SYSTEM FOR A MASS STORAGE DEVICE," published as U.S. 2016/0335198A1 on Nov. 17, 2016, the content of which is incorporated by reference herein in its entirety.

Figure 1B:
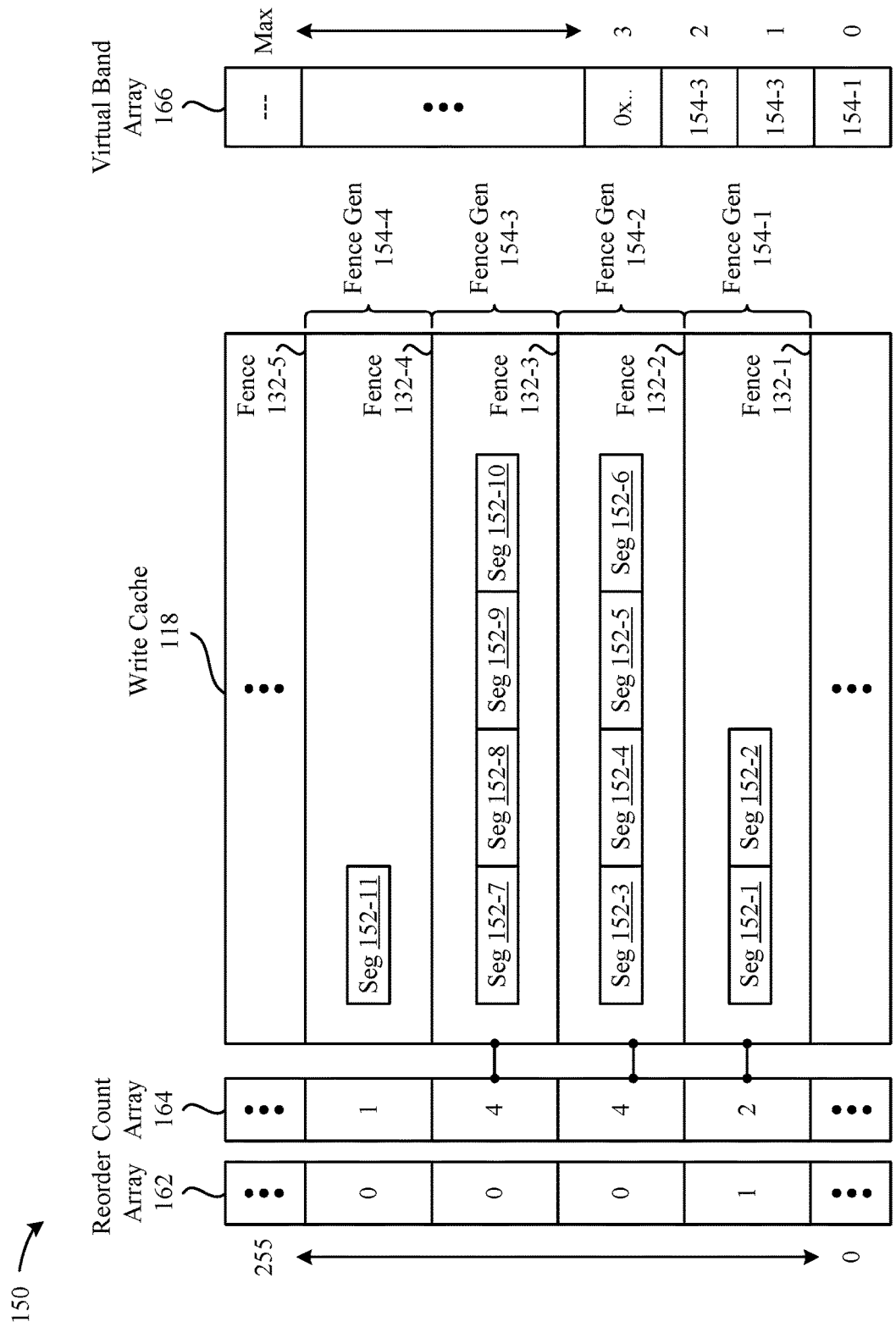

Accordingly, FIG. 1A provides an overview of the manner in which the computing device 102 can be configured to implement the techniques described herein, according to some embodiments. A more detailed breakdown of the write cache 118 will now be provided in conjunction with FIG. 1B. As shown in FIG. 1B, a conceptual diagram 150 includes an example breakdown of the manner in which information can be managed within the write cache 118 by the write cache manager 116. In particular, the example breakdown illustrates a snapshot of the write cache 118 in which four different fence generations 154 are being managed by the write cache manager 116. According to some embodiments, each fence generation 154 can represent a period of time in which write commands 130 are received by the write cache manager 116 between two different fence commands 132. For example, the fence generation 154-1 can be established between a fence command 132-1 and a fence command 132-2. Similarly, the fence generation 154-2 can be established between the fence command 132-2 and a fence command 132-3, while the fence generation 154-3 can be established between the fence command 132-3 and a fence command 132-4. Finally, the fence generation 154-4 can be established between the fence command 132-4 and a fence command 132-5.

As shown in FIG. 1B, the write cache 118 can be configured to enable the write cache manager 116 to simultaneously track up to two hundred and fifty-six (256) different fence generations 154. However, it is noted that this number is merely exemplary, and that the write cache manager 116/write cache 118 can be configured to manage any number of fence generations 154 without departing from the scope of this disclosure. In any case, as shown in FIG. 1B, each fence generation 154 can include one or more segments 152, where each segment 152 represents one or more write commands 130 received by the storage device 112 during the fence generation 154. According to some embodiments, the write cache manager 116 can maintain an overall count of unprocessed segments 152 for each fence generation 154 using a count array 164 that maps to the write cache 118. For example, as shown in FIG. 1B, the count array 164 indicates that fence generation 154-1 is associated with two unprocessed segments 152, the fence generation 154-2 is associated with four unprocessed segments 152, the fence generation 154-3 is associated with four unprocessed segments 152, and the fence generation 154-4 is associated with one unprocessed segment 152. Accordingly, the write cache manager 116 can be configured to update, within the count array 164, the corresponding entry for a given fence generation 154 each time a segment 152 within the fence generation 154 is received/processed. In this regard, the write cache manager 116 can utilize the count array 164 to readily identify fence generations 154 whose corresponding segments 152 have all been processed.

Additionally, as shown in FIG. 1B, the write cache manager 116 can maintain a reorder array 162 that can be used to indicate fence generations 154 in the write cache 118 whose corresponding segments 152 have been reordered (e.g., by the write cache manager 116), and thus no longer obey the ordering contracts established using fence commands 132 issued by the operating system 108/applications 110. In particular, a value of "1" (i.e., true) can indicate a valid stop point that obeys the fence contract if all data within the corresponding fence generation 154 exists at the end of a replay of the log information 122. Conversely, a value of "0" (i.e., false) can indicate a starting point of one or more fence generations 154 whose corresponding segments 152 have been reordered.

Additionally, as shown in FIG. 1B, the write cache manager 116 can maintain a virtual band array 166 that can be used to identify virtual bands (described below in conjunction with FIG. 1C) that can be safely erased after fence generations 154 have been successfully reflected within the log information 122. Notably, when write commands 130 (associated with segments 152) are reordered across a fence generation 154—and a sudden power loss occurs—a replay of the log information 122 might stop at an older fence generation 154 that includes pointers to virtual bands 134 within the non-volatile memory 120 that are invalid. In this regard, the virtual bands 134 cannot be erased until the updates to the log information 122 reach a relevant stopping point of fence generations 154, which can be maintained/identified using the virtual bands array 166. According to some embodiments, the association between the write cache 118 and the virtual bands array 166 can be tracked by the write cache manager 116 when the log information 122 is updated from inside of one of the reordered fence generations 154, as the write cache manager 116 is privy to the previous locations of the write commands 130.

Figure 1C:
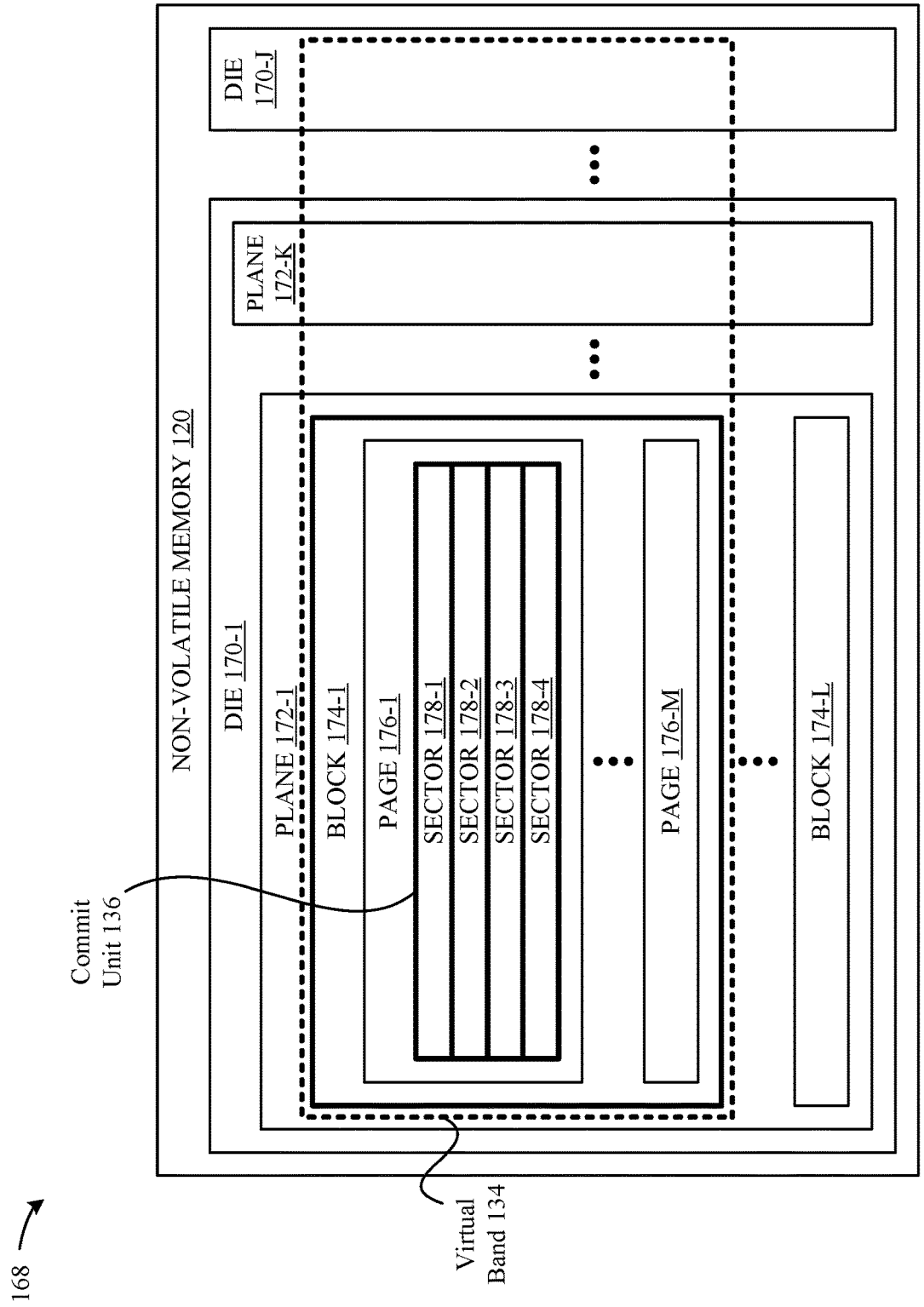

Accordingly, FIG. 1B provides an overview of the manner in which the write cache manager 116 can implement the write cache 118, according to some embodiments. Turning now to FIG. 1C, a more detailed breakdown of the manner in which the non-volatile memory 120 can be segmented is provided. As shown in the conceptual diagram 168 illustrated in FIG. 1C, the non-volatile memory 120 can include one or more dies 170, where each die 170 is separated into one or more planes 172. Additionally, as shown in FIG. 1C, each plane can be separated into one or more blocks 174, and each block 174 can be separated into one or more pages 176. According to some embodiments, and as shown in FIG. 1C, each page 176 can be composed of four sectors 178, where each sector 178 represents a fixed amount of storage space (e.g., 4 kB). It is noted that the hierarchical breakdown illustrated in FIG. 1C is merely exemplary, and that the non-volatile memory 120 can be segmented into fewer or more areas without departing from the scope of this disclosure. For example, each page 176 can include any number of sectors 178—e.g., two sectors 178 per page 176—and each sector can be any size (e.g., 2 kB, 8 kB, 16 kB, etc.). In any case, as shown in FIG. 1C, a virtual band 134 can logically encompass one or more blocks 174 across one or more dies 170, while a virtual stripe 182 can logically encompass one or more pages 176 across one or more dies 170. Additionally, as shown in FIG. 1C, a commit unit 136 can correspond to one complete page 176, such that the non-volatile memory 120 has a one page 176 per plane 172 commit unit requirement. It is noted that the commit unit 136 illustrated in FIG. 1C is exemplary, and that the commit unit 136 can be configured to encompass any continuous or distributed portion of the non-volatile memory 120 without departing from the scope of this disclosure.

Accordingly, FIGS. 1A-1C illustrate the manner in which the computing device 102 can be configured to implement the various techniques described herein. A more detailed explanation of these techniques will now be provided below in conjunction with FIGS. 2A-2C, 3A-3B, and 4.

Figure 2A:
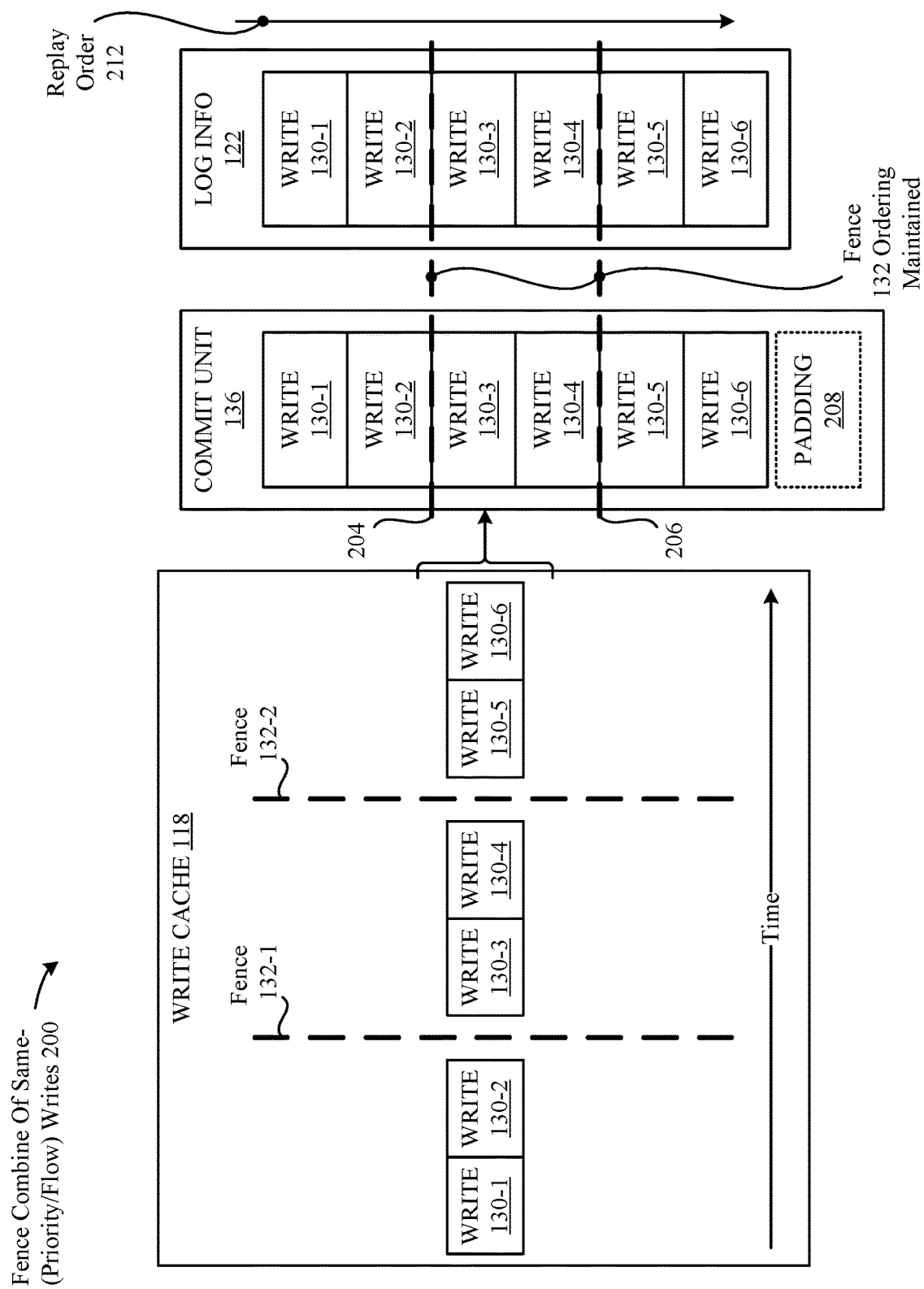
FIGS. 2A-2C illustrate conceptual diagrams of example scenarios in which a write cache manager can combine different write commands in accordance with fence commands prior to issuing the write commands to a non-volatile memory, according to some embodiments.
Figure 2B:
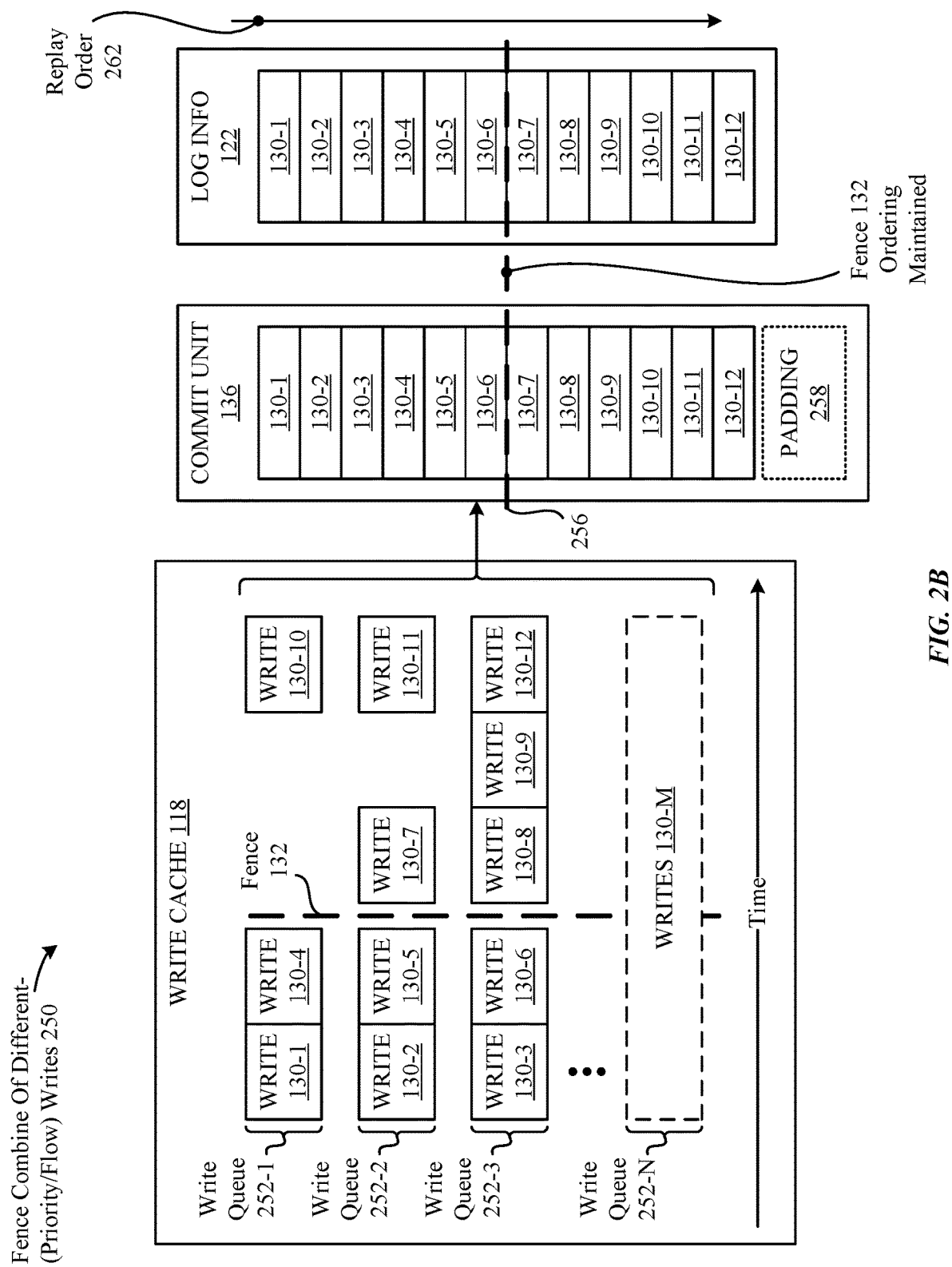
Figure 2C:
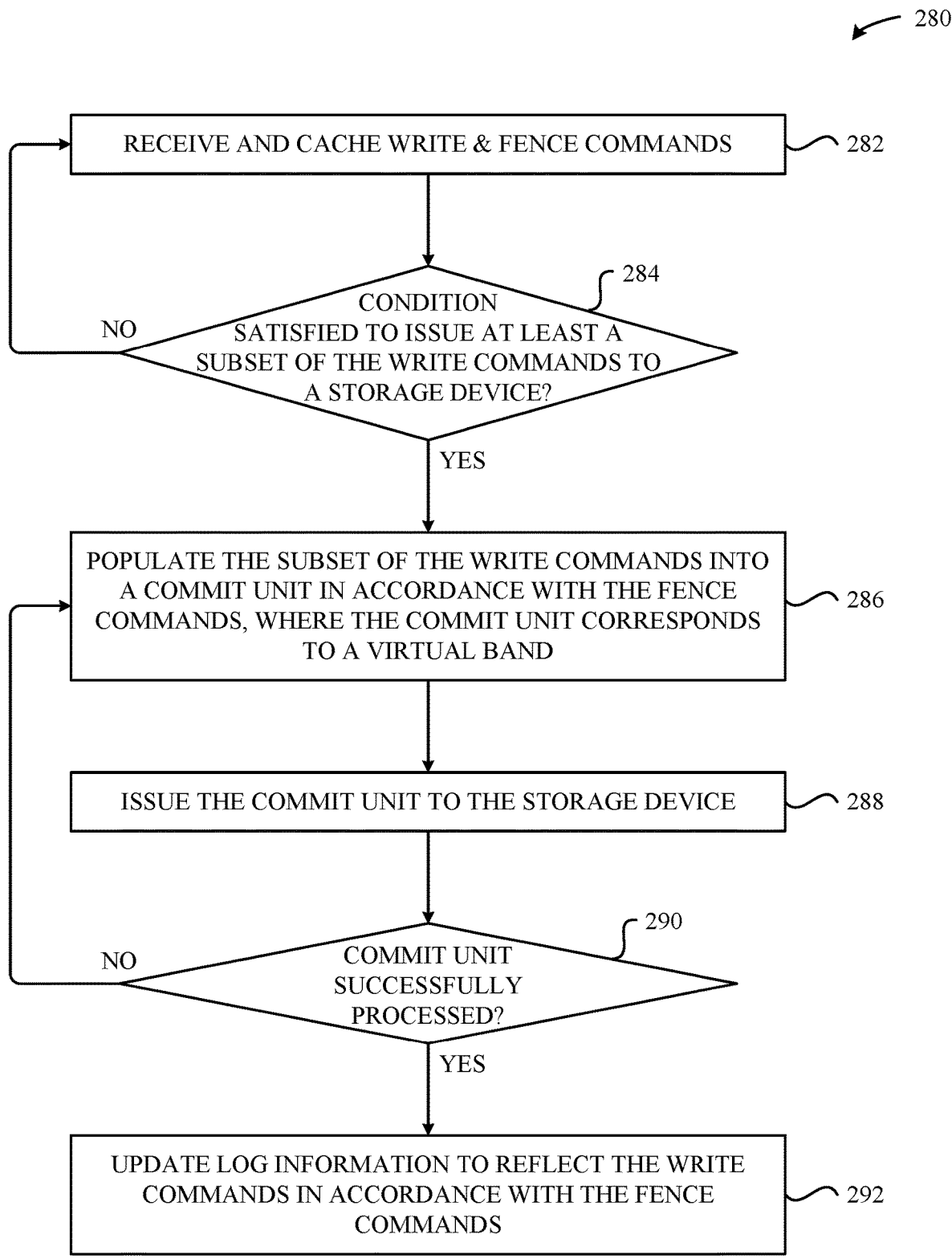

FIGS. 2A-2C illustrate conceptual diagrams of example scenarios in which the write cache manager 116 can combine different write commands 130 in accordance with fence commands 132 prior to issuing the write commands to the non-volatile memory 120, according to some embodiments. In particular, FIG. 2A illustrates a conceptual diagram 200 that involves combining six write commands 130 in accordance with two fence commands 132, where each of the write commands 130 share the same priority and flow properties. According to some embodiments, the priority for a given write command 130 can include "low," "medium," and "high," to indicate an overall urgency with which the write command 130 should be handled. It is noted that the foregoing priorities are exemplary, and that any number/types of priorities can be implemented by the write cache manager 116 without departing from the scope of this disclosure. According to some embodiments, the flow for a given write command 130 can provide a hint as to whether the data associated with the write command 130 is expected to be static—i.e., unlikely to be overwritten in a short amount of time (e.g., a digital photograph)—or dynamic—i.e., likely to be overwritten in a short amount of time (e.g., metadata). It is noted that the foregoing flows are exemplary, and that any number/types of flows can be implemented by the write cache manager 116 without departing from the scope of this disclosure.

As shown in FIG. 2A, an example state of the write cache 118 includes three write commands 130 that are separated by two fence commands 132, where the temporal order of the write commands 130 flows from left (older) to right (newer). In this regard, the write commands 130-1/130-2 are first written into the write cache 118, followed by the fence command 132-1. Next, the write commands 130-3/130-4 are written into the write cache 118, followed by the fence command 132-2. Additionally, the write commands 130-5/130-6 are written into the write cache 118, and are unbounded by an additional fence command 132. Again, it is noted that the illustration provided in FIG. 2A is merely exemplary, and that the write cache 118 can be configured to process additional write commands 130/fence commands 132 without departing from the scope of this disclosure. Moreover, it is noted that the write commands 130 are not represented as segments 152 (as in FIG. 1B) in the interest of simplifying this disclosure. In this regard, the write commands 130 can be construed as the underlying write commands 130 referenced by segments 152 that are stored in the write cache 118 and managed by the write cache manager 116.

According to some embodiments, the write cache manager 116 can be configured to monitor the write commands 130/fence commands 132 stored within the write cache 118 to identify one or more conditions under which the write commands 130 should be bundled together—in the interest of reducing commit unit 136 padding, as well as overall write amplification—and issued to the non-volatile memory 120. Such conditions can be based on, for example, an overall size of the commit unit 136, a number of unprocessed fence generations 154 (established by way of fence commands 132, as described above in conjunction with FIG. 1B) present in the write cache 118, a number of unprocessed write commands 130 present in the write cache 118, and/or other circumstances. It is noted that the foregoing circumstances are not meant to represent an exhaustive list, and that the write cache manager 116 can be configured to take other circumstances into account without departing from the scope of this disclosure.

In any case, when the write cache manager 116 identifies that the appropriate one or more conditions are satisfied, the write cache manager 116 can be configured to populate at least a subset of the write commands 130 into a commit unit 136 in accordance with the ordering of the fence commands 132. As described in greater detail herein, the commit unit 136 can correspond to a particular virtual band 134, such that the log information 122 can be updated with a pointer to the virtual band 134 to enable replay operations to be effectively executed. According to some embodiments, when the number of write commands 130 exceeds the number of available slots within the commit unit 136, the overflowing write commands 130 can be populated into one or more additional commit units 136. Alternatively, when the number of write commands 130 does not exceed the number of available slots within the commit unit 136, the write cache manager 116 can pad the slots (illustrated as padding 208 in FIG. 2A) with dummy data—often referred to as "no-ops"—so that the commit unit 136 minimum size requirements imposed by the storage device 112 are satisfied. However, as noted throughout this disclosure, a primary benefit of the caching techniques set forth herein is to reduce the overall amount of padding that is otherwise normally included when implementing conventional flush/ barrier commands.

In any case, when the commit unit 136 is issued to the non-volatile memory 120, the log information 122 can be updated to reflect the write commands 130 included in the commit unit 136. Importantly, and as shown in FIG. 2A, the ordering of the write commands 130—relative to the fence commands 132—is enforced by the write cache manager 116 in both the commit unit 136 and the log information 122. In this regard, the entities that issued the write commands 130/fence commands 132—e.g., the operating system 108/ applications 110—can rely on the write commands 130 being applied to the storage device 112 in-order, or not applied at all. In particular, the replay order 212 associated with the log information 122 will enable recovery scenarios to ensure that the write commands 130 are reflected only when the overall ordering dictated by the fence commands 132 remains intact. This approach can therefore be beneficial for applications 110 that care more about data coherency than data persistency, e.g., database applications.

Accordingly, FIG. 2A sets forth an example scenario in which write commands 130 sharing the same priority and flow properties can be processed by the write cache manager 116. However, as noted above, the write commands 130 can be issued with different priority and flow properties. Accordingly, FIG. 2B illustrates a conceptual diagram 250 that involves combining twelve different write commands 130— in accordance with one fence command 132—where different subsets of the write commands 130 are assigned different priority and/or flow properties. For example, a first set of write commands 130 associated with a write queue 252 can share the same "low" priority, the second set of write commands 130 associated a write queue 252-2 can share the same "medium" priory, and the third set of write commands 130 associated with a write queue 252-3 can share the same "high" priority, with all sets of the write commands 130 sharing the same flow property (e.g., "metadata"). It is noted that additional write commands 130 can be associated with other properties (i.e., beyond priority and flow), which is illustrated by way of additional write commands (leading up to the write commands 130-M) that can be associated with different write queues (leading up to the write queue 252-N).

As previously described above in conjunction with FIG. 2A, the write cache manager 116 can be configured to monitor the write commands 130/fence commands 132 stored within the write cache 118 to identify one or more conditions under which the write commands 130 should be combined and issued to the non-volatile memory 120. In turn, when the conditions are satisfied, the write cache manager 116 can be configured to populate at least a subset of the write commands 130 into a commit unit 136 in accordance with the ordering of the fence commands 132. When the commit unit 136 is issued to the non-volatile memory 120, the log information 122 can be updated to reflect the write commands 130 included in the commit unit 136. Importantly, and as shown in FIG. 2B, the ordering of the write commands 130 in both the commit unit 136 and the log information 122 is maintained by the write cache manager 116 in accordance with the fence command 132, despite the differences in properties associated with the write commands 130. In this regard, the replay order 262 associated with the log information 122 will enable recovery scenarios to ensure that the write commands 130 are reflected only when the overall ordering dictated by the fence command 132 remains intact.

Accordingly, FIG. 2B illustrates an example scenario in which the write cache manager 116 can effectively combine write commands 130 even when they have differing properties. Additionally, FIG. 2C illustrates a method 280 that provides a high-level breakdown of the techniques described above in conjunction with FIGS. 2A-2B. In particular, and as shown in FIG. 2C, the method 280 begins at step 282, where the write cache manager 116 receives and caches write commands 130 and fence commands 132—e.g., issued by the operating system 108/applications 110 executing thereon. At step 284, the write cache manager 116 determines whether at least one condition is satisfied to issue at least a subset of the write commands 130 to the storage device 112 (e.g., as described above in conjunction with FIGS. 2A-2B). If, at step 284, the write cache manager 116 determines that the at least one condition satisfied, then the method 280 proceeds to step 286. Otherwise, the method 280 proceeds back to step 282, where the write cache manager 116 processes additional write commands 130 and fence commands 132 until the at least one condition is satisfied.

At step 286, the write cache manager 116 populates the subset of the write commands 130 into a commit unit 136 in accordance with the fence commands 132, where the commit unit 136 corresponds to a virtual band 134 (e.g., as described above in conjunction with FIGS. 1C and 2A). At step 288, the write cache manager 116 issues the commit unit 136 to the storage device 112. At step 290, the write cache manager 116 determines whether the commit unit 136 was successfully processed. If, at step 290, the write cache manager 116 determines that the commit unit 136 was successfully processed, then the method 280 proceeds to step 292. Otherwise, the method 280 proceeds back to step 286, where the write cache manager 116 can reattempt to issue the subset of write commands 130 via another commit unit 136. At step 292, the write cache manager 116 updates the log information 122 to reflect the write command 130 in accordance with the fence commands 132 (e.g., as described above in conjunction with FIGS. 2A-2B).

Accordingly, FIGS. 2A-2C illustrate conceptual diagrams of example scenarios in which the write cache manager 116 can combine different write commands 130 in accordance with fence commands 132 prior to issuing the write commands to the non-volatile memory 120, according to some embodiments. In some cases, failures can occur when writing data into the non-volatile memory 120 via commit units 136, which are commonly referred to as "program failures." Importantly, such failures can compromise the overall coherency of one or more of the log information 122, the indirection information 124, and the data information 126. Therefore, it is important for the write cache manager 116 to properly identify and mitigate these program failures to ensure that the fence commands 132 provide their intended function.

Figure 3A:
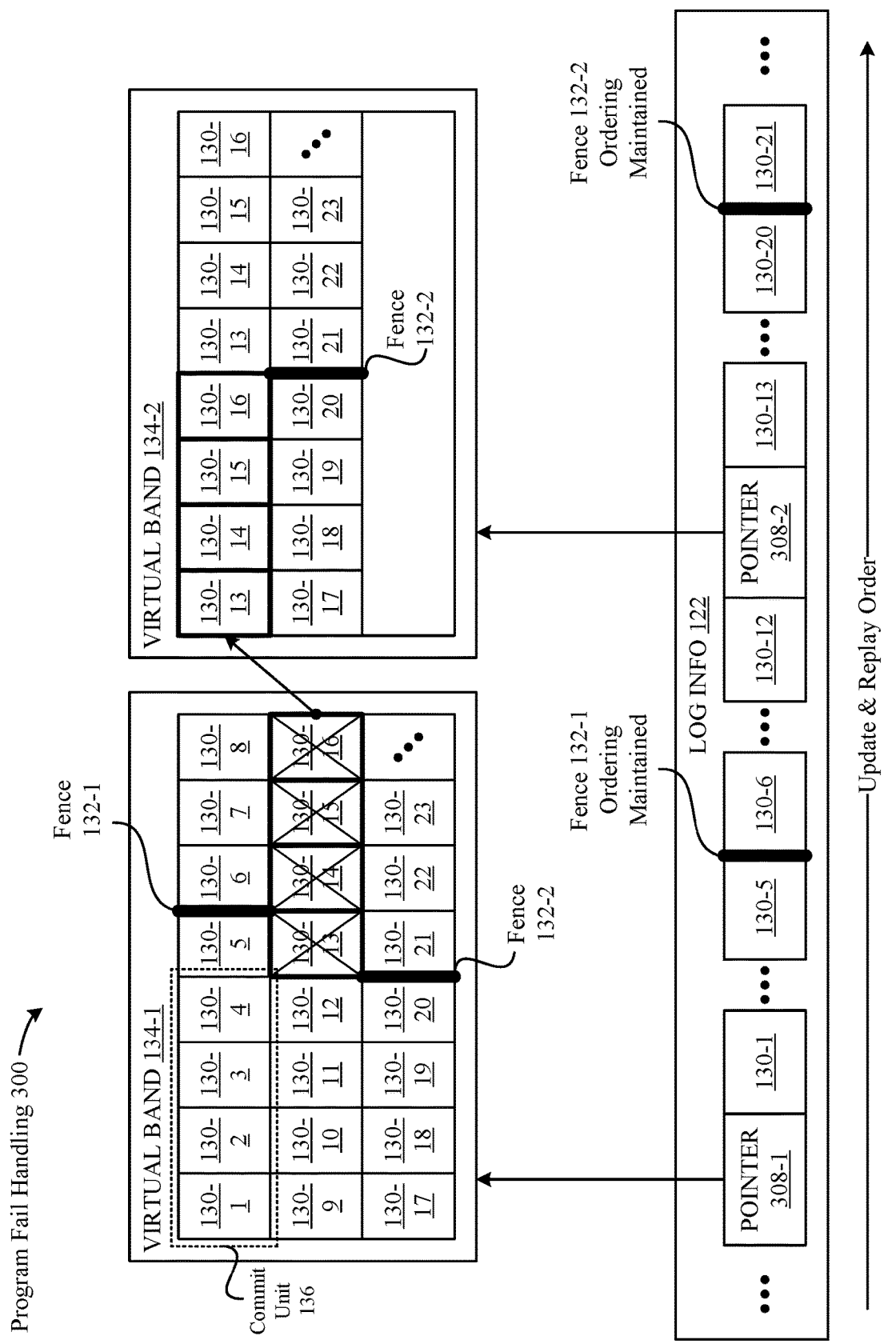
FIGS. 3A-3B illustrate conceptual diagrams of example scenarios in which (1) a program failure occurs when a write cache manager issues a commit unit to a non-volatile memory, and (2) a program failure recovery procedure is carried out in response to the failure, according to some embodiments.
Figure 3B:
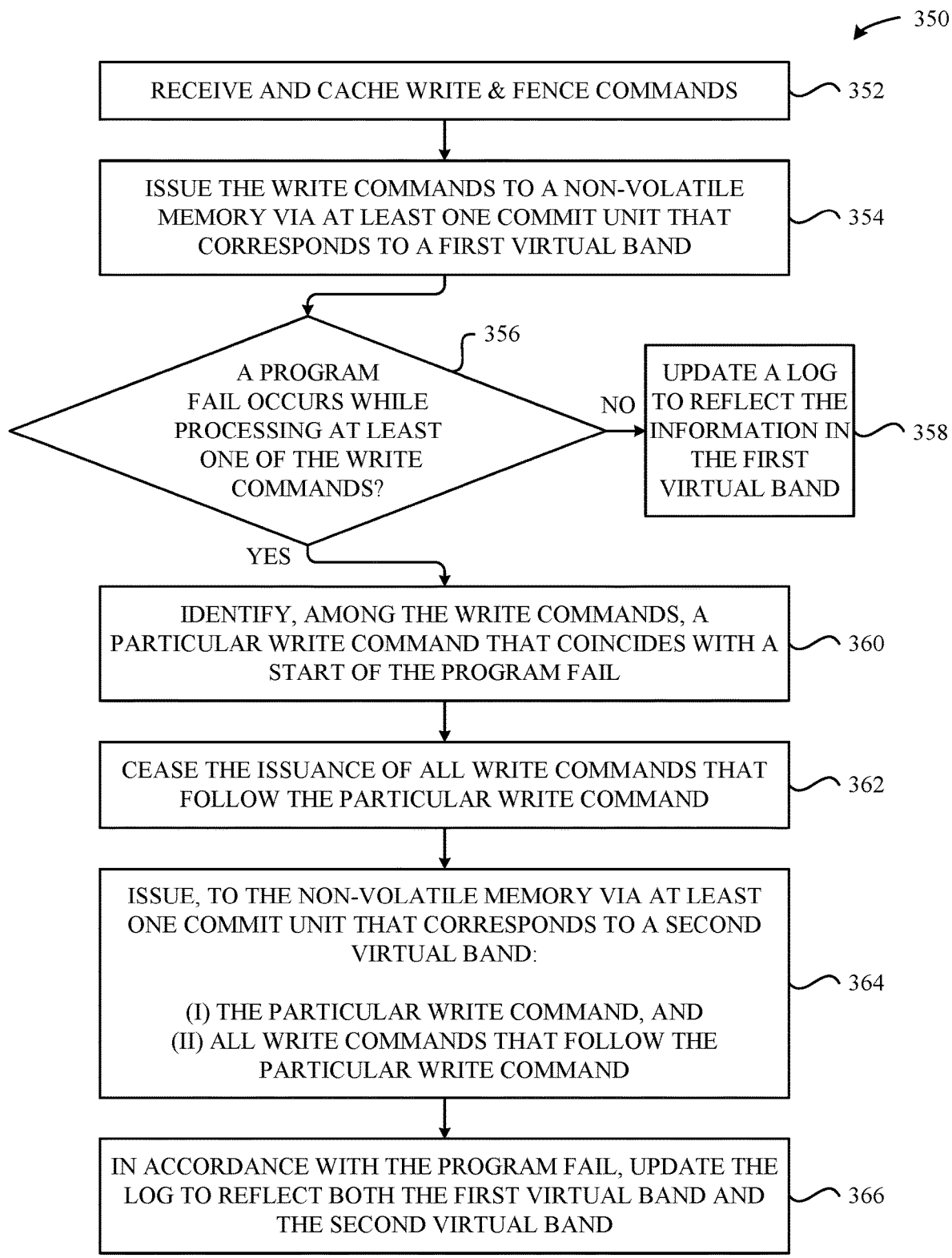

Accordingly, FIGS. 3A-3B illustrate conceptual diagrams of an example scenario in which (1) a program failure occurs when the write cache manager 116 issues a commit unit 136 to the non-volatile memory 120, and (2) a program failure recovery procedure is carried out in response to the failure. In particular, and as shown in the conceptual diagram 300 of FIG. 3A, various write commands 130 associated with a virtual band 134-1 are issued, via various commit units 136, to the non-volatile memory 120. For example, the write commands 130-1, 130-2, 130-3, and 130-4 can be issued by way a first commit unit 136, the write commands 130-5, 130-6, 130-7, and 130-8 can be issued by a second commit unit 136, and so on. It is noted that the capacity of the commit units 136 illustrated in FIG. 3A is exemplary, and that any form of commit unit 136 can be utilized (e.g., in accordance with differently-configured non-volatile memories 120) without departing from the scope of this disclosure. It is also noted that additional write commands 130 can be associated with the virtual band 134-1, as indicated by the diagonal ellipses at the bottom-right corner of the virtual band 134-1. In any case, as shown in FIG. 3A, the write commands 130 are separated by two distinct fence commands 132: a first fence command 132-1 that separates the write command 130-5 and the write command 130-6, and a second fence command 132-2 that separates the write command 130-20 and the write command 130-21.

As shown in FIG. 3A, a program failure occurs when processing the commit unit 136 associated with the write commands 130-13, 130-14, 130-15, and 130-16. This can occur for any reason, including a physical failure of the underlying non-volatile memory 120 to which the write commands 130-13, 130-14, 130-15, and 130-16 are directed, a hardware or software failure within the computing device 102, and so on. In any case, the write cache manager 116 can be configured to perform a program failure recovery procedure that attempts to mitigate the aftermath of the program failure. According to some embodiments, the program failure recovery procedure can involve ceasing the issuance of subsequent write commands 130 in association with the virtual band 134-1. In turn, the write cache manager 116 can update the log information 122 to include a pointer 308-1 that addresses the virtual band 134-1. In this manner, the log information 122 can also identify the write commands 130 associated with the virtual band 134-1 that were successfully processed prior to the program failure, i.e., the write commands 130-1 through 130-12. It is noted that the ordering of the write commands 130-1 through 130-12 is maintained relative to the fence command 132-1 within the log information 122. In this regard, the write commands 130 that were successfully processed are accurately reflected in the log information 122, and can be used, if necessary, to perform a replay of the log information 122 in a recovery scenario.

Additionally, the program failure recovery procedure can involve reissuing the write commands 130-13, 130-14, 130-15, and 130-16—as well as the write commands 130 that follow those write commands 130 (i.e., write commands 130-17 through 130-23)—via commit units 136 associated with a virtual band 134-2. According to some embodiments, the virtual band 134-2 can be distinct from the virtual band 134-1 in both the logical and physical sense. For example, the virtual band 134-2 can be separate from the virtual band 134-1, and be associated with a different area of physical space within the non-volatile memory 120 in comparison to the virtual band 134-1. Notably, and as shown in FIG. 3A, the foregoing write commands 130 can be issued such that the ordering forced by the fence command 132-2 is maintained within the virtual band 134-2. In this regard, the program failure recovery procedure can further involve the write cache manager 116 updating the log information 122 to include a pointer 308-2 to the virtual band 134-2, followed by information about each of the write commands 130 that were successfully processed after the program fail occurring, i.e., the write commands 130-13 through 130-23.

Accordingly, FIG. 3A illustrates an example scenario in which the write cache manager 116 can effectively handle program failure scenarios, and perform program failure recovery procedures to mitigate the issues. Additionally, FIG. 3B is provided and illustrates a method 350 that provides a high-level breakdown of the program failure detection and handling techniques described above in conjunction with FIG. 3A. In particular, and as shown in FIG. 3B, the method 350 begins at step 352, where the write cache manager 116 receives and caches write commands 130 and fence commands 132 (e.g., using the write cache 118, as described herein). At step 354, the write cache manager 116 issues the commit units 136 to the non-volatile memory 120 via at least one commit unit 136 that corresponds to a first virtual band 134.

At step 356, the write cache manager 116 determines whether a program fail occurs while processing at least one of the write commands 130. If, at step 356, the write cache manager 116 determines that a program fail occurs while processing at least one of the write commands 130, then the method 350 proceeds to step 360. Otherwise, the method 350 proceeds to step 358, where the write cache manager 116 updates the log information 122 to reflect the information in the first virtual band 134 (e.g., as described above in conjunction with FIG. 3A). At step 360, the write cache manager 116 identifies, among the write commands 130, a particular write command 130 that coincides with a start of the program fail (e.g., as also described above in conjunction with FIG. 3A). At step 362, the write cache manager 116 ceases the issuance of all write commands 130 that follow the particular write command 130.

At step 364, the write cache manager 116 issues, to the non-volatile memory 120 via at least one commit unit 136 that corresponds to a second virtual band 134: (i) the particular write command 130, and (ii) all write commands 130 that follow the particular write command 130. Additionally, at step 366, the write cache manager 116 updates the log to reflect both the first virtual band 134 and the second virtual band 134 (e.g., as described above in conjunction with FIG. 3A).

Accordingly, FIGS. 3A-3B illustrate conceptual diagrams of an example scenario in which (1) a program failure occurs when the write cache manager 116 issues a commit unit 136 to the non-volatile memory 120, and (2) a program failure recovery procedure is carried out in response to the failure. It is noted that additional techniques can be implemented to enhance the overall efficiency of the fence commands 132 described herein. In particular, and according to some embodiments, the write cache manager 116 can be configured to (1) identify scenarios where write commands 130 result in overwrites of the same data across different fence generations 154, and (2) streamline the write commands 130 to improve overall efficiency.

Figure 4:
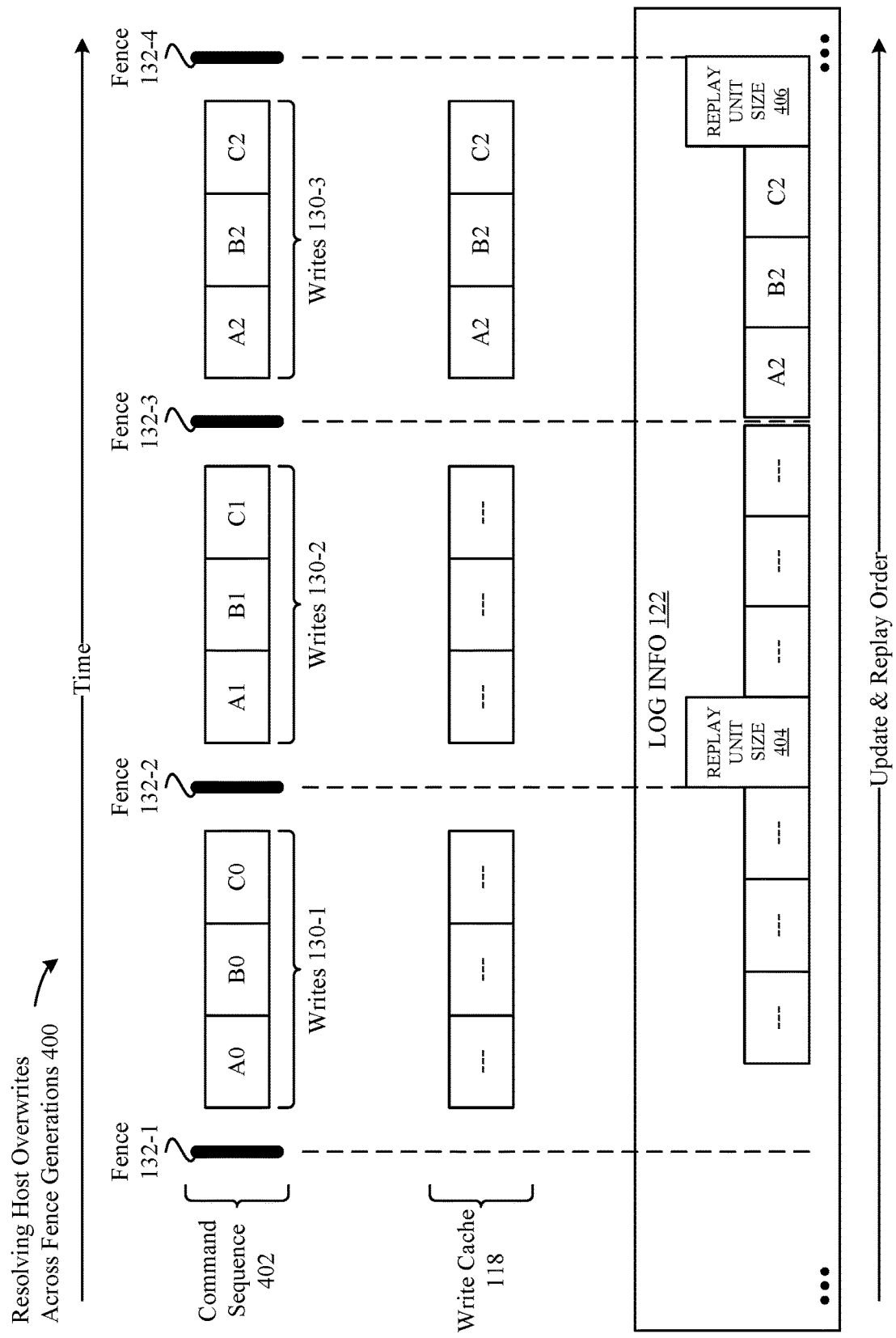
FIG. 4 illustrates a conceptual diagram of an example scenario in which overwrites of data items across different fence generations can be exploited to improve efficiency, according to some embodiments.

Accordingly, FIG. 4 illustrates a conceptual diagram 400 of an example scenario in which three separate overwrites of three data items occur across three different fence generations 154, according to some embodiments. In particular, the conceptual diagram 400 illustrates a manner in which the write cache manager 116 can exploit the example scenario to achieve improved operability and lower write amplification effects. As shown in FIG. 4, a command sequence 402 illustrates an example order in which various write commands 130 and fence commands 132 are issued by an entity executing on the computing device 102, e.g., the operating system 108/applications 110. In particular, the command sequence 402 involves a first fence command 132-1, followed by three write commands 130-1 that are separately directed to data items "A" "B" and "C", where the "0" appended to the data items indicates a version of the data items relative to the flow of the example illustrated in FIG. 4. As also shown in FIG. 4, the command sequence 402 involves a second fence command 132-2, followed by three write commands 130-2 that are separately directed to the data items "A", "B", and "C", and that cause their versions to be updated to "1". As further shown in FIG. 4, the command sequence 402 involves a third fence command 132-3, followed by three write commands 130-3 that are separately directed to the data items "A", "B", and "C", and that cause their versions to be updated to "2". Additionally, the command sequence 402 involves a fourth fence command 132-4 that bounds the three write commands 130-3, thereby effectively placing them within their own fence generation 154. As described in greater detail below, the write cache manager 116 can be configured to identify when overwrites occur (by way of the write commands 130) to data items that span across one or more fence generations 154, and take steps to improve the overall efficiency of carrying out the write commands 130.

It is noted that the fence command 132-4 illustrated in FIG. 4 can be issued by the write cache manager 116 in response to identifying that the write commands 130-3 result in overwrites. In this manner, the write cache manager 116 can effectively enforce the appropriate ordering of the various data items that precede and succeed the write commands 130-3. Additionally, it is noted that it is possible for other write commands 130 (in addition to those illustrated in FIG. 4) to be issued within the various fence generations 154, but that they are omitted in the interest of simplifying this disclosure. For example, a write command 130 directed to a data item "D" can exist within the second fence generation 154 (bounded by the fence commands 132-2 and 132-3), but not in other fence generations 154, such that no overwrite activity occurs. In this regard, the write cache manager 116 can be configured to retain, within the write cache 118/log information 122, information relevant to the write command 130 directed to the data item "D"—while modifying the information relevant to the write commands 130 directed to the data items "A", "B", and "C" (as described in greater detail below).

As shown in FIG. 4, the command sequence 402 can be inserted into the write cache 118, but can be modified by the write cache manager 116 to achieve improved performance. In particular, the write cache manager 116 can be configured to identify the various overwrites that occur across the different fence commands 132, and acknowledge that the data items "A", "B", and "C" at version "2" is a coherent point from the perspective of the entity that issued the command sequence 402. In that regard, the write cache manager 116 can be configured to disregard the write commands 130-1 and 130-2 (that contributed to versions "1" and "2" of the data items), and issue the write commands 130-3 to the non-volatile memory 120. Notably, this enables the overall writes/write amplification that would otherwise occur through the issuance of the write commands 130-1 and 130-2 to be mitigated, as they are effectively disregarded by the write cache manager 116.

Additionally, and to maintain an overall enforcement of the ordering expected by the entity, the write cache manager 116 can be configured to update the log information 122 to reflect the adjustments that were made to the write commands 130-1, 130-2, and 130-3. In particular, and as shown in FIG. 4, the write cache manager 116 can include, within the log information 122, replay unit size entries 404 and 406 that act as a corresponding pair. In particular, the replay unit size entries 404 and 406 can effectively bound the write commands 130-3 and enable the corresponding fence generation 154 (bounded by the fence commands 132-3 and 132-4) to be identified within the log information 122. Moreover, the replay unit size entries 404 and 406 can indicate that the write commands 130-3 are required to be replayed in their entirety, or not replayed at all. For example, a replay of the log information 122—e.g., in a recovery scenario after a power failure—can effectively indicate that each of the data items "A", "B", and "C" must exist as version "2", or only exist as versions that correspond to a previous coherent point. Otherwise, an order violation (relative to the fence commands 132) can occur, because the fence generations 154 associated with the write commands 130-1 and 130-2 were effectively rendered obsolete by the write cache manager 116. Accordingly, the techniques illustrated in FIG. 4 can enable the write cache manager 116 to improve the overall efficiency of the execution of write commands 130 given that fence commands 132 only require data ordering to be enforced, but not data persistency. In this regard, the overall benefits achieved using the foregoing techniques can outweigh scenarios where the write commands 130-1 and 130-2 are potentially lost during a power failure, especially considering that a majority of computing devices have some form of a battery and make power failures rare.

In addition to the foregoing techniques, it is noted that the write cache manager 116 can be configured to improve conventional flush/barrier commands in addition to the fence commands 132 described herein, without departing from the scope of this disclosure. Specifically, efficiency improvements can be achieved any time an entity—e.g., the operating system 108, an application 110, etc.—issues a flush command, doesn't wait for the flush command to complete, and continues issuing new writes. In this regard, the write cache manager 116 can group the data together received prior to and after the flush command, and send the data to the non-volatile memory 120, so long as the flush command is not acknowledged after the log information 122 is updated. In this regard, this approach can help reduce the overall amount of padding that is typically required when issuing commit units in comparison to conventional implementations that immediately persist all outstanding data in response to flush commands.

It is additionally noted that this disclosure primarily involves the write cache manager 116 carrying out the various techniques described herein for the purpose of unified language and simplification. However, other entities can be configured to carry out these techniques without departing from this disclosure. For example, other software components (e.g., the operating system 108, applications 110, firmware(s), etc.) executing on the computing device 102 can be configured to carry out all or a portion of the techniques described herein without departing from the scope of this disclosure. Moreover, other hardware components included in the computing device 102 can be configured to carry out all or a portion of the techniques described herein without departing from the scope of this disclosure. Further, all or a portion of the techniques described herein can be offloaded to another computing device without departing from the scope of this disclosure.

Figure 5:
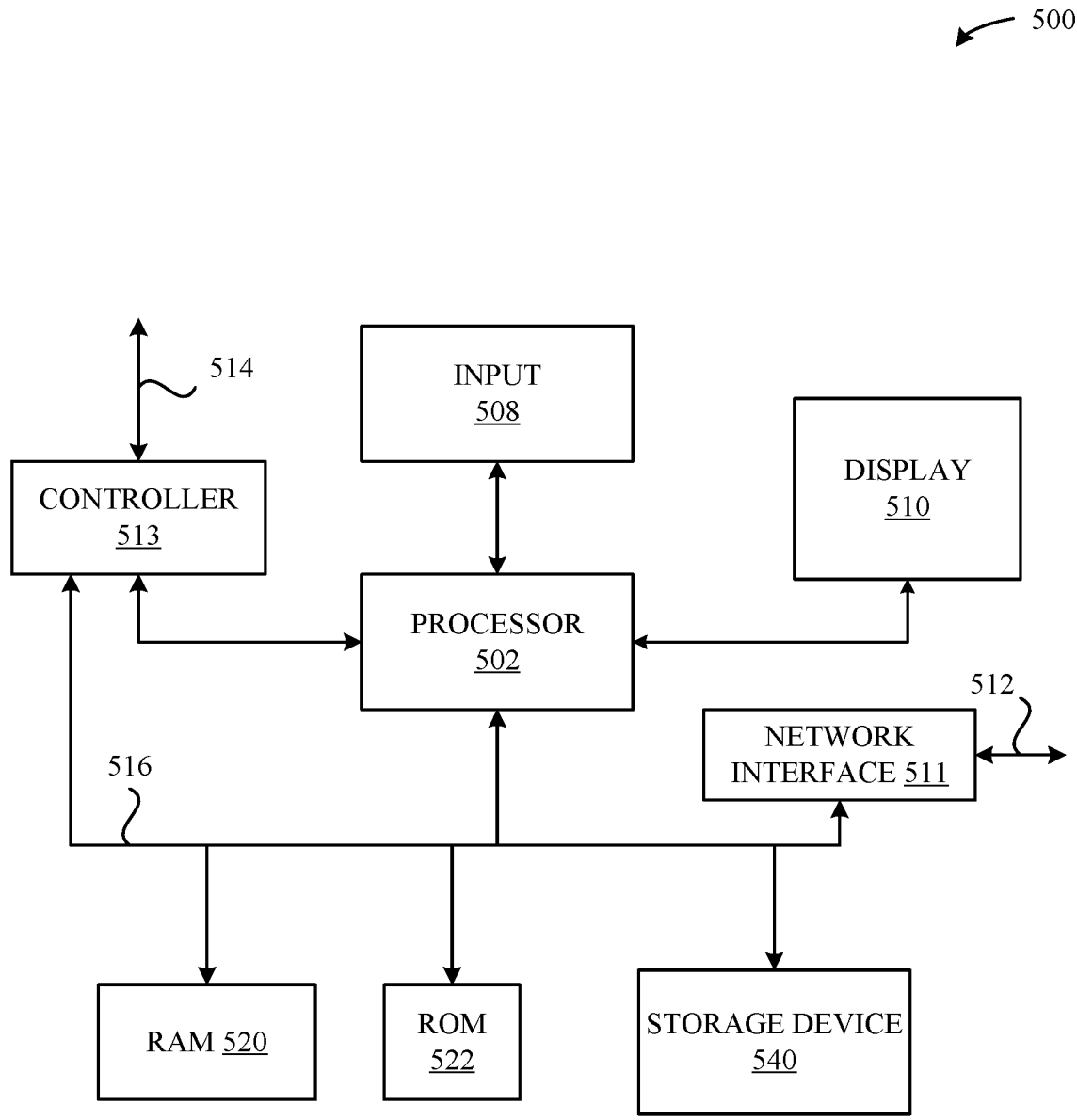
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can comprise a single disk or a plurality of disks (e.g., SSDs), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

What is claimed is:

1. A method for reducing write amplification when processing write commands directed to a storage device, the method comprising:
   receiving a first plurality of write commands and a second plurality of write commands, wherein the first plurality of write commands and the second plurality of write commands are separated by a fence command;
   caching, within a volatile write cache managed by the storage device, the first plurality of write commands, the second plurality of write commands, and the fence command; and
   in response to identifying that at least one condition is satisfied:
      issuing, by way of a commit unit of the storage device:
         the first plurality of write commands to the storage device, and the second plurality of write commands to the storage device subsequent to the first plurality of write commands, and
      writing, into non-volatile log information stored in a non-volatile memory managed by the storage device:
         information reflecting that the first plurality of write commands precede the second plurality of write commands, and
         a pointer to a virtual band in which the commit unit is logically included to enable, during a replay procedure, write commands that were successfully processed in accordance with fence commands prior to a program failure.

2. The method of claim 1, wherein the at least one condition is satisfied when:
   a number of unprocessed fence commands stored within the volatile write cache exceeds a fence command threshold; and/or
   a number of unprocessed write commands present in the volatile write cache exceeds a write command threshold.

3. The method of claim 1, wherein the non-volatile log information is updated subsequent to identifying that both the first plurality of write commands and the second plurality of write commands are successfully processed by the storage device.

4. The method of claim 3, wherein information about the fence command is omitted from the non-volatile log information.

5. The method of claim 1, further comprising:
   identifying, among the second plurality of write commands, a second write command that overwrites data associated with a first write command included in the first plurality of write commands;
   preventing the first write command from being issued to the storage device; and
   updating the non-volatile log information to indicate, during a replay of the non-volatile log information, that the data is valid only when the second write command is successfully executed.

6. The method of claim 1, wherein:
   the commit unit corresponds to a minimum size that is based on a configuration of the storage device, and
   the virtual band logically encompasses a plurality of blocks that horizontally span across a plurality of dies of the storage device.

7. The method of claim 1, further comprising:
   identifying an occurrence of a failure by the storage device to successfully process at least one write command included in the first plurality of write commands; and
   issuing, to the storage device via a second commit unit:
      (i) the at least one write command, and
      (ii) all write commands subsequent to the at least one write command included in the first plurality of write commands.

8. The method of claim 7, wherein the second commit unit is associated with a second virtual band that maps to a second area of the storage device that is distinct from an area of the storage device that is mapped to by the virtual band associated with the commit unit.

9. At least one non-transitory computer readable storage medium configured to store instructions that, when executed by at least one processor included in a computing device, cause the computing device to reduce write amplification when processing write commands directed to a storage device accessible to the computing device, by carrying out steps that include:
   receiving a first plurality of write commands and a second plurality of write commands, wherein the first plurality of write commands and the second plurality of write commands are separated by a fence command;

caching, within a volatile write cache managed by the storage device, the first plurality of write commands, the second plurality of write commands, and the fence command; and in response to identifying that at least one condition is satisfied:
issuing, by way of a commit unit of the storage device:
the first plurality of write commands to the storage device, and the second plurality of write commands to the storage device subsequent to the first plurality of write commands, and
writing, into non-volatile log information stored in a non-volatile memory managed by the storage device:
information reflecting that the first plurality of write commands precede the second plurality of write commands, and
a pointer to a virtual band in which the commit unit is logically included to enable, during a replay procedure, write commands that were successfully processed in accordance with fence commands prior to a program failure.

10. The at least one non-transitory computer readable storage medium of claim 9, wherein the at least one condition is satisfied when:
a number of unprocessed fence commands stored within the volatile write cache exceeds a fence command threshold; and /or
a number of unprocessed write commands present in the volatile write cache exceeds a write command threshold.

11. The at least one non-transitory computer readable storage medium of claim 10, wherein the non-volatile log information indicates that the first plurality of write commands were successfully processed by the storage device prior to the second plurality of write commands being successfully processed by the storage device.

12. The at least one non-transitory computer readable storage medium of claim 9, wherein:
the commit unit corresponds to a minimum size that is based on a configuration of the storage device, and
the virtual band logically encompasses a plurality of blocks that horizontally span across a plurality of dies of the storage device.

13. The at least one non-transitory computer readable storage medium of claim 9, wherein the steps further include:
identifying an occurrence of a failure by the storage device to successfully process at least one write command included in the first plurality of write commands; and
issuing, to the storage device via a second commit unit:
(i) the at least one write command, and
(ii) all write commands subsequent to the at least one write command included in the first plurality of write commands.

14. The at least one non-transitory computer readable storage medium of claim 13, wherein the second commit unit is associated with a second virtual band that maps to a second area of the storage device that is distinct from an area of the storage device that is mapped to by the virtual band associated with the commit unit.

15. A computing device configured to reduce write amplification when processing write commands directed to a storage device, the computing device comprising:
at least one processor; and
at least one memory storing instructions that, when executed by the at least one processor, cause the computing device to:
receiving a first plurality of write commands and a second plurality of write commands, wherein the first plurality of write commands and the second plurality of write commands are separated by a fence command;
caching, within a volatile write cache managed by the storage device, the first plurality of write commands, the second plurality of write commands, and the fence command; and
in response to identifying that at least one condition is satisfied:
issuing, by way of a commit unit of the storage device:
the first plurality of write commands to the storage device, and the second plurality of write commands to the storage device subsequent to the first plurality of write commands, and
writing, into non-volatile log information stored in a non-volatile memory managed by the storage device:
information reflecting that the first plurality of write commands precede the second plurality of write commands, and a pointer to a virtual band in which the commit unit is logically included to enable, during a replay procedure, write commands that were successfully processed in accordance with fence commands prior to a program failure.

16. The computing device of claim 15, wherein the at least one condition is satisfied when:
a number of unprocessed fence commands stored within the volatile write cache exceeds a fence command threshold; and/or
a number of unprocessed write commands present in the volatile write cache exceeds a write command threshold.

17. The computing device of claim 16, wherein the non-volatile log information indicates that the first plurality of write commands were successfully processed by the storage device prior to the second plurality of write commands being successfully processed by the storage device.

18. The computing device of claim 15, wherein:
the commit unit corresponds to a minimum size that is based on a configuration of the storage device, and
the virtual band logically encompasses a plurality of blocks that horizontally span across a plurality of dies of the storage device.

19. The computing device of claim 15, wherein the at least one processor further causes the computing device to:
identify an occurrence of a failure by the storage device to successfully process at least one write command included in the first plurality of write commands; and
issue, to the storage device via a second commit unit:
(i) the at least one write command, and
(ii) all write commands subsequent to the at least one write command included in the first plurality of write commands.

20. The computing device of claim 19, wherein the second commit unit is associated with a second virtual band that maps to a second area of the storage device that is distinct from an area of the storage device that is mapped to by the virtual band associated with the commit unit.

* * * * *